(12) United States Patent
Klaassen et al.

(10) Patent No.: US 12,502,674 B2
(45) Date of Patent: Dec. 23, 2025

(54) SPECIMEN COLLECTION DEVICE

(71) Applicant: DAKLAPACK EUROPE B.V., Lelystad (NL)

(72) Inventors: Dave Willem Klaassen, Ermelo (NL); Eryk Marcin Tomczak, Ermelo (NL)

(73) Assignee: DAKLAPACK EUROPE B.V., Lelystad (NL)

( * ) Notice: Subject to any disclaimer, the term of this patent is extended or adjusted under 35 U.S.C. 154(b) by 18 days.

(21) Appl. No.: 17/622,519

(22) PCT Filed: Jun. 26, 2020

(86) PCT No.: PCT/EP2020/068092
§ 371 (c)(1),
(2) Date: Dec. 23, 2021

(87) PCT Pub. No.: WO2020/260360
PCT Pub. Date: Dec. 30, 2020

(65) Prior Publication Data
US 2022/0203356 A1    Jun. 30, 2022

(30) Foreign Application Priority Data

Jun. 26, 2019 (NL) ...................................... 2023385

(51) Int. Cl.
*B01L 3/00* (2006.01)
*A61B 10/00* (2006.01)

(52) U.S. Cl.
CPC .......... *B01L 3/5029* (2013.01); *A61B 10/007* (2013.01); *A61B 10/0096* (2013.01);
(Continued)

(58) Field of Classification Search
CPC ............. B01L 3/5029; B01L 2300/069; B01L 2300/0832; B01L 2400/0481; B01L 2400/0478; A61B 10/007; A61B 10/0096
See application file for complete search history.

(56) References Cited

U.S. PATENT DOCUMENTS 5,827,675 A    10/1998 Skiffington et al.
6,489,172 B1   12/2002 Bachand et al.
(Continued)

FOREIGN PATENT DOCUMENTS

WO    WO 2012/150713 A1    11/2012
WO    WO 2018/188458 A1    10/2018

OTHER PUBLICATIONS

International Preliminary Examination Report (PCT/IPEA/409 and PCT/IPEA/416), issued in PCT/EP2020/068092, dated May 20, 2021.
(Continued)

*Primary Examiner* — Samuel P Siefke
(74) *Attorney, Agent, or Firm* — Birch, Stewart, Kolasch & Birch, LLP

(57) ABSTRACT

A specimen collection device includes a test stick with an absorbent pad and a stick receptacle with a squeeze chamber and an outlet port at a distal end of the stick receptacle. The test stick has a stick body which extends through a pad channel. A stick tip extends through the outlet port when squeezing the absorbent pad against a chamfer end face of the squeeze chamber. The absorbent pad does not pass through the outlet port but remains in the squeeze chamber. Only the stick passes through the outlet port during squeezing. Advantageously, the test stick remains aligned inside the stick receptacle during squeezing which contributes to a proper release of fluid from the absorbent pad to obtain the fluid specimen in a specimen tube.

19 Claims, 5 Drawing Sheets

(52) U.S. Cl.
CPC . *B01L 2300/069* (2013.01); *B01L 2300/0832* (2013.01); *B01L 2400/0481* (2013.01)

(56) References Cited

U.S. PATENT DOCUMENTS

| | | |
|---|---|---|
| 7,114,403 B2 | 10/2006 | Wu et al. |
| 2003/0064526 A1 | 4/2003 | Niedbala et al. |
| 2006/0292034 A1 | 12/2006 | Gould et al. |
| 2009/0024060 A1 | 1/2009 | Darigrand et al. |

OTHER PUBLICATIONS

International Search Report (PCT/ISA/210) issued in PCT/EP2020/068092 mailed on Aug. 10, 2020 .
Netherland Search Report of application 2023385 dated Feb. 14, 2020.
Written Opinion (PCT/ISA/237) issued in PCT/EP2020/068092 mailed on Aug. 10, 2020.

SPECIMEN COLLECTION DEVICE

The present invention relates to a specimen collection device for collecting a fluid specimen in a specimen tube. Such a fluid specimen may be any volume of fluid to carry out a test, examination or study. The fluid specimen may originate from any fluid, e.g. a body fluid, like blood or urine or other fluid to be tested, like a water sample from a polluted source, a fluid specimen from a beverage etc.

In particular, the specimen collection device is arranged to carry out urinalysis. The specimen tube is preferably a widely available specimen tube. For urinalysis, an example of such a standardised specimen tube is for example known in the market as a BD Vacutainer Tube, StatSpin, Fisherbrand UriSystem or Kova Economy Urinalysis Tube. These standardised specimen tubes are suitable to be used in a test instrument.

Further, the invention relates to a method for collecting a fluid specimen in a specimen tube in which use is made of a swab. In particular, the invention relates to a method for handling urine specimens and collecting an urine specimen in an urine tube.

It is remarked that any discussion of disclosures, acts, materials, devices, articles or the like included in the present specification is for the purpose of providing a context for the present invention, and is not to be taken as an admission that any such matters form part of the prior art or were before the priority date of each claim of this application common general knowledge in the field relevant to the present invention.

Urine tests are widely carried out for measuring health and well-being and are an important tool for clinical diagnosis. Clinical information obtained from a urine specimen is influenced by the collection method, in which the specimens are handled in a certain way.

A drawback of such collection methods is that a used swab and its absorbent pad are freely exposed in a working space. In some collection methods, a swab should be wetted multiple times to obtain a sufficient quantity of fluid in the specimen tube. During this handling, the absorbent pad of the swab may be unintentionally contacted which might affect the fluid specimen.

US2009024060 discloses a system with a collector with a collecting element formed by an absorbent material like a pad or sponge. The collecting element is initially sized so that a sufficient volume of sample fluid may be absorbed from a fluid source. The presence of the sample fluid in the collecting element may cause the collecting element to expand inside. The collecting element generally holds the sample until the collecting element is manipulated to release the sample. The collecting element is attached to an end of a plunger. In an embodiment, a protrusion or barb extends from the plunger end to pierce the collecting element and hold the collecting element against the plunger end in frictional engagement. The system further has an extractor incorporated in a storage container. The extractor is configured to release the sample from the collector into the container. The extractor has an extractor cavity defined by a wall. The wall of the cavity has an annular section that causes the wall to turn transversely inward such that the cavity narrows at a distance from the opening. When introducing the collecting element into the extractor, the collecting element moves into abutment with the annular section. Because an inner diameter of the annular section is smaller than the diameter of the collecting element, the annular section makes contact with an outer portion of the bottom surface of the colleting element, resulting in compression of the collecting element in the longitudinal direction and a release of the sample fluid from the collecting element.

A drawback of the system occurs after collecting a sample when the collecting element is to be removed from the extractor. Then the collecting element is freely exposed. A user may get in contact with the collecting element which is undesired. Resting sample fluid may drip from the absorbent pad. To solve this, a detachable plunger is proposed to allow the collecting element being left in the extractor. However, this might only be helpful when the collecting element is to be squeezed once in a single step to fill the container. Multiple insertions and squeezings cannot be carried out. Additionally, in carrying out a test later on, a laboratory technician still needs to remove the collection element. Then the collection element is freely exposed and sample fluid can be spoiled.

A drawback of this way of squeezing of the collecting element is that the squeezing is not optimal. It is desired to squeeze as much as possible sample fluid from the collecting element to prevent dripping when the absorbent pad is removed from the excavator.

U.S. Pat. No. 7,114,403 discloses a device for collecting and storing fluids and applying the fluid to test device. The device comprises a sample collector including a swab with an absorbent pad at a distal end of the swab. The absorbent pad is configured to collect a liquid sample. The absorbent pad may comprise a foam or sponge material. The device comprises a structure formed by a receiving member and a reservoir. The receiving member defines an inner volume sized to receive at least the absorbent pad. In the receiving member, the absorbent pad is squeezed to release a liquid sample. A reservoir is fluidly connected with the internal volume of the receiving member to collect the released liquid sample. The receiving member and the reservoir form a one-piece item which can be closed by a dropper assembly after squeezing the absorbent pad.

A drawback of this device is that the swab with the absorbent pad is freely exposed after its use. The absorbent pad is uncovered and might be unintentionally touched by an operator which is undesirable. Another drawback is that the structure formed by the receiving member and the reservoir is not fitting in commonly used test apparatuses. Many tests on samples are carried out by using test apparatuses which often operate with more or less standardised specimen tubes as mentioned above. For this reason of a need for special test equipment, the disclosed device is also not satisfying.

A known specimen collection device for liquid based microbiology, a so-called LBM Urisponge marketed by a company Copan comprises a specimen tube and a swab. The swab comprises a stick body which is provided with an absorbent pad at a distal end and a handgrip at a proximal end. The swab is very small and configured to be received into the specimen tube. The absorbent pad is sized to be received in the specimen tube. The handgrip of the swab is formed as a cap for closing the specimen tube after inserting the absorbent pad in its interior space. In a collection method in which the known specimen collection device is used, the absorbent pad will be contained in the specimen tube which means that the absorbent pad is less exposed after collecting the fluid specimen.

However, when finally carrying out a test, the swab needs to be removed from the specimen tube which might render an incident in which the absorbent pad holding the fluid specimen is susceptible to external influences. Another drawback is that due to the small sized absorbent pad which must fit inside the specimen tube, only a small quantity of fluid specimen can be absorbed.

WO2012/150713 discloses a similar sample collection system with a stick holding an absorbent body. The absorbent body is positioned in between a stopper and a stick tip which extends beyond the absorbent body. The stick is insertable into a container, in which the container is provided with a funnel-shaped squeeze chamber having a narrowed opening. When inserting the stick into the container, the stick tip passes through the narrowed opening.

The absorbent body is also pulled through the narrowed opening which is then compressed by the squeeze chamber in a lateral direction.

The disclosed sample collection system has some disadvantages. A drawback of the sample collection system is that the stick and cap for closing the container are integral parts which means that in use a laboratory technician is exposed to the absorbent body when the cap is removed. The technician might spoil sample fluid. For that reason, a needle is proposed to suck up a sample from the container. The need of an additional tool for dealing with a sample is disadvantageous.

A test apparatus and accompanying test method is disclosed in U.S. Pat. No. 5,827,675 which overcomes at least some of the above mentioned drawbacks. A rapid and efficient test is disclosed for the detection of various test samples from materials or surfaces in a wide variety of test methods. The test apparatus is particularly adapted for in-field or out of the laboratory testing by unsophisticated untrained persons. The test apparatus is composed of a sample unit and a connected test unit for a detection of test samples. A swab-type device is disclosed which does not require separate pipettes and test tubes. Test results may be determined by detaching the test unit for carrying out a test in a test instrument.

In use, a swab is removed from a non-use position, wetted and reinserted into a probe chamber and then moved to a test position, whereby a distal end of the swab then contacts a reagent test means positioned in the test unit. Finally, the swab is retracted from the test position back to the non-used position within the probe chamber for later use or disposal.

It is further disclosed in U.S. Pat. No. 5,827,675 to provide the tube wherein the plastic is flexible, particularly toward or near the one of the test unit, so that a user may squeeze the one end of the tube generally intermediate the test unit and the sample unit, so as to insure the test sample on the swab is squeezed out. After squeezing, the swab is retracted into the tube.

It is further disclosed that in an optional embodiment, a squeezing mechanism may be desired for full recovery of the sample and products of the interaction of the sample and the reagents. In this embodiment, the chamber's opening is narrowed to enable the swab, when withdrawn to the non-use position, to squeeze out all liquids into the test microtube for best recovery of color/luminescence products, or a flexible plastic tube squeezed about the probe means capping the apparatus.

The retracted swab of this disclosed test apparatus is beneficial in that the swab remains shielded by the simple unit. Further, a detachable test unit is beneficial in that it allows a use of commercially wide available test equipment.

However, this disclosed test apparatus still has some disadvantages. A drawback is that it might be necessary to use the swab multiple times when a larger amount of fluid is required as a fluid specimen in the test unit. Using the swab multiple times for successively absorbing and squeezing fluid increases a risk of an affected fluid specimen during handling. It is desired to provide a further improved test apparatus in which a release of absorbed fluid into a test tube is ameliorated, while at the same time at least partially overcoming the above mentioned drawbacks.

The general object of the present invention is to at least partially eliminate the above mentioned drawbacks and/or to provide a usable alternative. More specific, it is an object of the invention to ameliorate an in-field usable specimen collection device for collecting a fluid specimen in a commonly available specimen tube by untrained persons, and in which a test stick is provided with an absorbent pad which is less vulnerable to external influences during its handling.

According to the invention, this object is achieved by a specimen collection device according to claim 1.

According to the invention a specimen collection device for collecting a fluid specimen in a fluid specimen tube is provided. The specimen collection device comprises a test stick, a stick receptacle for receiving the test stick and a specimen tube which is connectable to the stick receptacle. The stick receptacle has a spout for connecting the specimen tube to the stick receptacle. The spout fits to the opening of the specimen tube. The spout is a projecting tube or lip from which a liquid is conveyed from the stick receptacle to the specimen tube. The specimen tube is positioned in extension of the stick receptacle. The specimen tube is positioned at a distal end of the stick receptacle. Beneficially, the specimen collection device is adapted to be used with widely available standard specimen tubes which can be used in commonly available laboratory equipment to carry out tests.

The test stick is configured to absorb the fluid specimen. The test stick comprises an elongated stick body. The stick body has a proximal stick end to be held by the user. Preferably, the stick body has a grip, in particular a plate-shaped finger grip, at the proximal stick end. The stick body has a stick tip at a distal stick end. The stick body is provided with an absorbent pad. The absorbent pad is positioned at the distal stick end. The absorbent pad contains a liquid absorbing material for absorbing fluid.

The stick receptacle has an interior squeeze chamber for squeezing the absorbent pad. When squeezing the absorbent pad, the absorbent pad is compressed to extract fluid to obtain the fluid specimen out of the absorbent pad. The stick receptacle is open at a proximal end for inserting the stick tip into the squeeze chamber. The squeeze chamber has a chamber end face at a distal end of the stick receptacle for compressing the absorbent pad to release the fluid specimen from the absorbent pad when the absorbent pad is squeezed against the chamber end face. The stick receptacle has an outlet port at the distal end for discharging the fluid specimen.

The absorbent pad comprises a pad channel. The pad channel extends from a first pad end face to or near a second pad end face. The stick body extends inside the absorbent pad through the pad channel. Due to this structure, when inserting the test stick into the stick receptacle, the stick tip will be received in the outlet port. The stick tip is then supported by the outlet port which provides an improved alignment of the test stick in the stick receptacle during squeezing. The stick body will remain aligned with an axial axis of the stick receptacle which may reduce a squeezing malfunction. The absorbent pad is sized to remain in the squeeze chamber. The absorbent pad does not pass through the outlet port during squeezing. Only the stick tip passes through the outlet port. The absorbent pad slides and is squeezed along the stick body. Herewith, the specimen collection device according to the invention provides an improved squeezing of the absorbent pad.

Before a starting of a squeezing operation, the stick tip preferably extends through the absorbent pad along at least 90% of a length of the absorbent pad. Due to this structure, in an insertion movement of the test stick into the stick receptacle, the stick tip reaches the outlet port of the stick receptacle before squeezing a main portion of the absorbent pad. The stick tip may first pierce through an end region of the absorbent pad before squeezing the main portion. When the stick tip passes through the outlet port, the outlet port aligns and supports the stick body. The outlet port functions as a guidance to the stick body. The stick body will get aligned along the axial axis of the stick receptacle. The guidance by the outlet port may prevent a bending or even buckling of the stick body which might adversely affect an effectiveness of the squeezing. After insertion of the test stick, the absorbent pad abuts the chamber end face. During squeezing, the absorbent pad is compressed and slides along the stick body. The absorbent pad does not pass through the outlet port. The absorbent pad will be compressed along its length in an even manner. The absorbent pad will be compressed by an exerted compression force which is carried out more optimal due to centring and alignment of the stick body with a central axis of the stick receptacle port. The alignment of the stick body improves a uniform squeezing of the absorbent pad. The improved squeezing operation may result in an optimum release of fluid out of the absorbent pad which contributes to obtaining a required volume of fluid specimen in the specimen tube.

The specimen collection device according to the invention may provide several advantages in addition.

One of the advantages is that the absorbent pad of the test stick may have a sufficient large absorbent capacity such that the collection of the fluid specimen in the specimen tube may be carried out by a single step of absorbing and squeezing out. Preferably, the absorbent pad is elongated. The absorbent pad may have a length of at least 5 cm and a diameter of at least 10 mm. Herewith, sufficient fluid may be absorbed in one step of absorption. A user only needs to bring the absorbent pad a single time in contact with the fluid. Subsequently, a fluid specimen may be collected in the specimen tube by a single squeezing action. Preferably, the squeezing action is a compressing of the absorbent pad in the axial direction of the stick receptacle. The absorbent pad is slidably connected to the stick body. Such a reduced handling of the test stick improves the quality of collecting the fluid specimen. Preferably, the absorbent pad has an absorbent capacity of at least 0.5 mL, in particular at least 2 mL and at most 12 mL.

An advantage is that the specimen tube is detachable from the specimen collection device, such that only this specimen tube can be send to a laboratory, while the stick receptacle and test stick can be disposed. In comparison with the sample collection system of WO2012/150713, according to the invention, the absorbent pad is not received in the specimen tube, but is directly disposable after collecting the sample. The specimen tube is removable from the stick receptacle. The stick receptacle includes the test stick with absorbent body. Just the specimen tube with a fluid sample is received at a laboratory. No absorbent pad need to be removed by laboratory personnel in which sample fluid might be spoiled.

Another advantage is that the specimen collection device can be used by untrained people. The specimen collection device is suitable for self-use. The specimen collection device may comprise a package including a label with some simple instructions to the user to collect the fluid specimen in a specimen tube.

A further advantage is that the test stick may remain contained in the stick receptacle after collecting the fluid specimen in the specimen tube. The test stick inside the stick receptacle after use remains shielded which may prevent a fluid contact. The test stick and the stick receptacle may be a disposable item configured for a single use.

Another benefit is that the specimen collection device may allow a use of widely available specimen tubes. Many test equipment is configured to operate with these common specimen tubes. Advantageously, the specimen collection device according to the invention is suitable to be used in a high variety of test methods and accompanying test instruments.

In an embodiment of the specimen collection device according to the invention, the absorbent pad comprises a fully through pad channel. The pad channel is an open channel. The pad channel extends from the first pad end face to the second pad end face. The pad channel extends along the whole length of the absorbent pad. Preferably, the absorbent pad has a cylindrical shape in which the pad channel centrally extends through the absorbent pad.

In an alternative embodiment, the pad channel may extend until close to the second pad end face. The second pad end face may be a channel closing end face forming the distal stick end. The pad channel may extend along a distance of at least 90% of the length of the absorbent pad. In use, when squeezing the absorbent pad, the stick tip may puncture through the absorbent pad material at the distal stick end when the absorbent pad material abuts to the chamber end face. The stick tip may get through the absorbent pad to be received in the outlet port of the stick receptacle.

In a preferred embodiment of the specimen collection device according to the invention, the stick tip has a tip head which extends beyond the absorbent pad. The tip head is exposed outside the absorbent pad. The stick body fully extends through the pad channel. The positioning of the tip head outside the absorbent pad ensures that the absorbent pad will always be squeezed in a situation that the tip head is received in the outlet port. Preferably, the tip head has a converting shape which may contribute to a proper introduction of the tip head into the outlet port. The tip head may be tapered or conical. The tip head may be sharp-pointed and have an apex. The tip head may for example be arrow-shaped. The tip head is preferably mushroom-shaped in which the tip head has a conical front portion and an outer diameter which is larger than the stick body. The conical front portion provides a centring working and at the same time a soft front surface which is convenient in handling the test stick.

In an embodiment of the specimen collection device according to the invention, the stick body has a pressure member which is positioned in abutting engagement with the first pad end face of the absorbent pad. Preferably, the pressure member is disc-shaped. When squeezing the absorbent pad, a pressing force is exerted by the pressure member onto the absorbent pad. The absorbent pad is squeezed in between the chamber end face and the pressure member. The presence of the pressure member further optimises the squeezing operation.

In an embodiment of the specimen collection device according to the invention, the absorbent pad is enclosed in between the pressure member and the tip head. Preferably, the absorbent pad is connected to the test stick by a form closure, also called a form fit. Both the pressure member and the tip head has an outer diameter which is larger than the inner diameter of the pad channel. Due to the compressibility and the form fit, the absorbent pad is slidably connected to the stick body. Advantageously, the form fit of the absorbent pad in between the pressure member and the tip head may render an adhesive, a glue, redundant. The slidable connection prevents the absorbent pad from being pulled through the outlet opening of the receptacle stick.

In an embodiment of the specimen collection device according to the invention, the specimen collection device is an urine specimen collection device. The urine specimen collection device is configured for collecting an urine specimen in a urine tube. The urine specimen collection device can be used in a method of urinalysis. The urine specimen collection device comprises a test stick with a urine sponge forming the absorbent pad. The urine sponge is configured for receiving the urine specimen. The urine sponsor has a porosity, in particular a PPI (pores per inch) of at least 25 to at most 50, which porosity is suitable to receive the urine specimen when holding the urine sponge in a urine stream.

In an embodiment of the specimen collection device according to the invention, the outlet port of the stick receptacle is non-circular. A non-circular outlet port may be beneficial in receiving and supporting a stick body having a circular cross-section to maintain a sufficient through flow for discharging fluid. In particular, the outlet port comprises at least one outlet port dent.

The at least one dent may be beneficial for properly guiding the stick body through the outlet port while at the same time blocking a passage of the absorbent pad. The outlet port may be the star-shaped, in which the outlet port comprises a plurality of outlet port dents to provide a multidirectional support for guiding the stick body.

In an embodiment of the specimen collection device according to the invention, the chamber end face is tapered in a length direction of the squeeze chamber. Preferably, the squeeze chamber, in particular the chamber end face, comprises at least one rib for improving a squeezing of the absorbent pad.

In an embodiment of the specimen collection device according to the invention, the stick receptacle has a spout for connecting the specimen tube by inserting the spout into the specimen tube. The specimen tube fits onto the spout. The spout comprises the outlet port. The spout has an outer circumferential surface which is configured to connect the specimen tube.

In an embodiment of the specimen collection device according to the invention, the specimen collection device further comprises a specimen tube. The specimen tube is connectable to the spout of the stick receptacle for receiving the fluid specimen. The specimen collection device and specimen tube may be packaged as a kit, in particular a do-it-yourself kit to provide a complete set to a client to obtain a fluid specimen. The specimen tube may be detached from the receptacle by a user and closed for sending the specimen tube to a laboratory to carry out a test method. The specimen tube may be closable by a tube closure. In particular, the tube closure is a tube cap which fits on a tube head of the specimen tube.

In an embodiment of the specimen collection device according to the invention, the stick receptacle comprises a spout having a staggered outer diameter, such that a variety of specimen tubes may fit onto the spout. Both a large and small specimen to a fit on the same specimen collection device. Advantageously, the specimen collection device can be used for multiple test methods. The spout has an elongated spout body having a length in which along the length, the spout body has a first outer diameter which is larger than a second outer diameter. A specimen tube with a first inner diameter may fit onto the first outer diameter, while a specimen tube with a second inner diameter may fit onto the second outer diameter.

Further, the invention relates to a kit for collecting a fluid specimen comprising a sterile package containing a specimen collection device according to the invention. The kit is provided with instructions for a user for obtaining a fluid specimen.

Further, the invention relates to a method for collecting a fluid specimen in a specimen tube. Preferably, the method is a urinalysis method in which a urine specimen is collected. The method comprises the step of providing a specimen collection device according to the invention. The specimen collection device comprises a test stick with an absorbent pad and a stick receptacle with a squeeze chamber. The stick receptacle has an outlet port at a distal end. In particular, the method may comprise a preparing step of removing the test stick out of a stick receptacle to start collecting the fluid specimen. The specimen collection device may be delivered to a user in a package in which the test stick is inserted in the stick receptacle. Herewith, the test stick can be used in a sterile condition. In a step of the method, a fluid specimen is collected by placing the test stick in contact with a fluid and absorbing a volume of fluid in the absorbent pad. In a step of the method, the test stick is inserted into the squeeze chamber of the stick receptacle and pressed, such that the stick tip extends through the outlet port before a main portion of the absorbent pad is squeezed. A main portion means that the absorbent pad is substantially squeezed in a situation that the stick tip extends through the outlet port. In particular, the main portion corresponds with at least 90% of the total amount of absorbed liquid. Less than 10% may be released in a phase of squeezing wherein the tip stick has not reached the outlet port.

In an embodiment of the method according to the invention, the step of collecting the fluid specimen is carried out only once to obtain a sufficient volume of fluid forming the fluid specimen. The absorbent pad of the plastic is sized in correspondence with a required quantity of fluid specimen. The absorbent pad has a sufficient large absorbent capacity to obtain the fluid specimen by a single handling of the test stick.

The invention will be explained in more detail with reference to the appended drawings. The drawings show a practical embodiment according to the invention, which may not be interpreted as limiting the scope of the invention. Specific features may also be considered apart from the shown embodiment and may be taken into account in a broader context as a delimiting feature, not only for the shown embodiment but as a common feature for all embodiments falling within the scope of the appended claims, in which:

Figure 1:
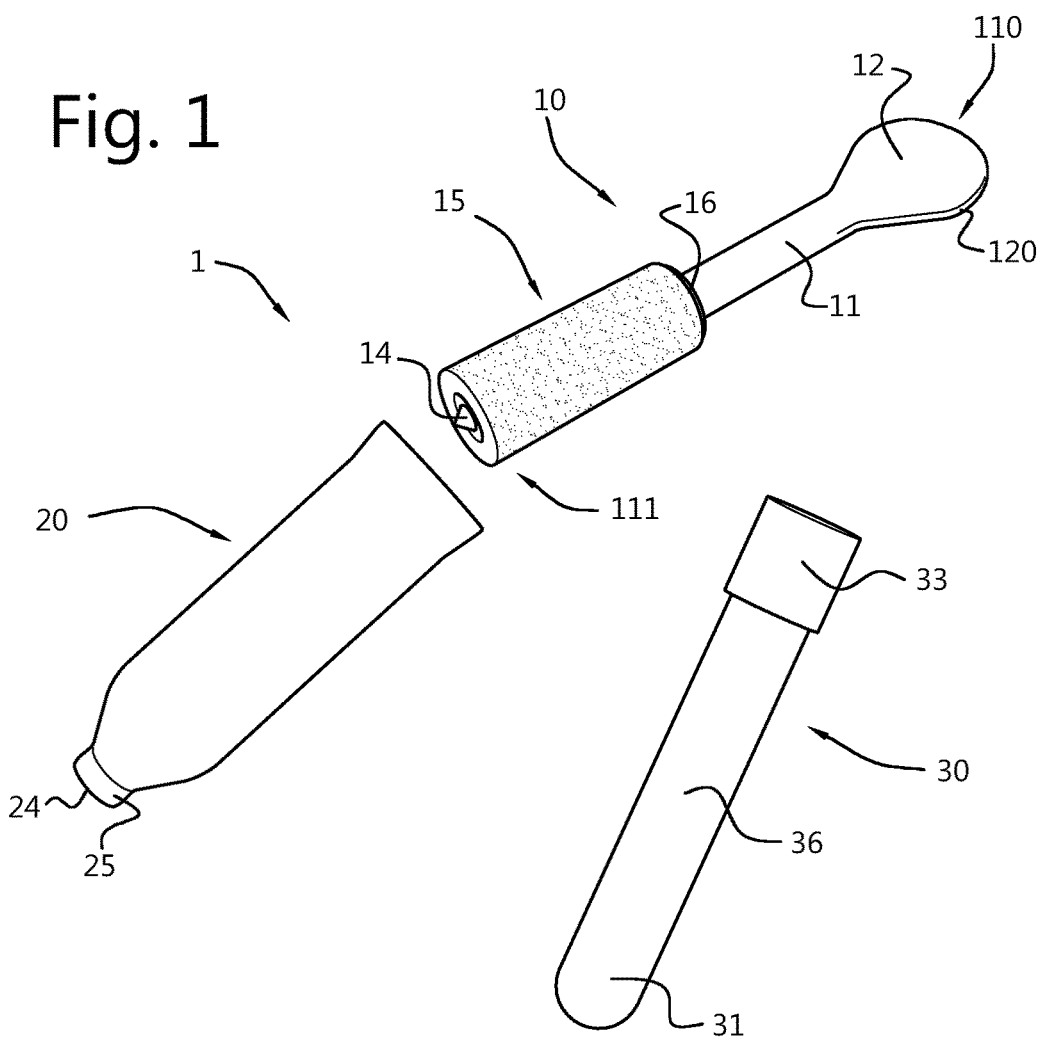
FIG. 1 shows a perspective view two main components of the specimen collection device according to the invention in combination with a connectable specimen tube.

Unless defined otherwise, all technical and scientific terms used herein have the same meaning as commonly understood by one of ordinary skill in the art to which this invention belongs. Generally, the nomenclature used herein and the manufacture or methods described below are well known and commonly employed in the art. Conventional methods are used for laboratory procedures, such as those provided in the art and various general references.

Terms of orientation such as "up" and "down", "upper" or "lower" or "proximal" and "distal" and the like refer to orientation of the parts during use of the device. Where a term is provided in the singular, the inventors also contemplate the plural of that term. The nomenclature used herein and the laboratory methods described below are those well known and commonly employed in the art.

'Specimen' or 'sample' may be used interchangeably. A sample is here considered to be the same as a specimen. 'Sample' or 'specimen' denotes any material to be assayed for the presence and/or concentration of an analyte in a sample or specimen, or to determine the presence and/or numbers of one or more components of a sample or specimen, or to make a qualitative assessment of a sample or specimen.

Viscous liquid, semi-solid, or solid specimens may be used to create liquid solutions, eluates, suspensions, or extracts that can be samples. For example, throat or genital swabs may be suspended in a liquid solution to prepare for a fluid specimen. Fluid specimens can include a combination of liquids, solids, gasses, or any combination thereof, as, for example a suspension of cells in a buffer or solution. Specimens can comprise biological materials, such as cells, microbes, organelles, and biochemical complexes.

A fluid specimen to be absorbed by the specimen collection device according to the present invention can be made from solid, semisolid or highly viscous materials, such as soils, fecal matter, tissues, organs, biological fluids or other samples that are not fluid in nature. For example, these solid or semi-solid samples can be mixed with an appropriate solution, such as a buffer, such as a diluent or extraction buffer. The sample can be macerated, frozen and thawed, or otherwise extracted to form a fluid sample. Residual particulates can be removed or reduced using conventional methods, such as filtration or centrifugation.

Examples of fluid specimens that may be collected by using a specimen collection device of the present invention include bodily fluids including blood, serum, plasma, saliva, urine, ocular fluid, semen, and spinal fluid; water samples, such as samples of water from oceans, seas, lakes, rivers, and the like, or samples from home, municipal, or industrial water sources, runoff water or sewage samples; and food specimens, such as milk or wine.

Identical reference signs are used in the drawings to indicate identical or functionally similar components.

FIG. 1 shows a perspective view of the specimen collection device 1 according to the invention. The device 1 comprises two main components respectively a test stick 10, a stick receptacle 20 which can be assembled in combination with a specimen tube 30.

As shown in FIG. 1, the specimen collection device 1 comprises a test stick 10. The test stick is arranged to be gripped by a user and to absorb the fluid specimen. The test stick comprises an elongated stick body 11. The stick body 11 has a proximal stick end 110 which is provided with a grip 12. The grip 12 is formed by a plate shaped portion which has a substantially circular shape, more in particular elliptical shape. The grip 12 has an upstanding outer circumference formed by a ridge 120. Herewith, the grip 12 is configured to be held by two fingers of a user. The user may stably held the test stick 10 by holding the finger grip 12 in between a thumb and an index finger.

The specimen tube 30 has a tube body 31. The tube body 31 has a tube head 32 which may be provided with a tube cap or other tube closure 33. The tube body 31 has a tube bottom 34. The tube bottom 34 may be flat or tapered for carrying out related test methods.

The device 1 is arranged for collecting a fluid specimen in the specimen tube 30. The fluid specimen is a volume of liquid. The volume of liquid is to be used in a testing or analysing method.

The illustrated specimen collection device 1 is in particular configured to carry out an urinalysis method in which a urine specimen is to be collected in a urine tube 30. Here, the depicted specimen tube 30 is a urine tube which is widely available for carrying out urinalyses methods. Typically, such a urine tube has a tube volume of at most 15 mL. The tube volume may be indicated by a scale 35 at an outer side of the tube body 31. Preferably, the specimen collection device 1 is configured for a single collecting step to obtain a fluid specimen with a volume of at most 4 mL in one step in which the specimen collection device is used in combination with a 4 mL specimen tube.

Figure 2:
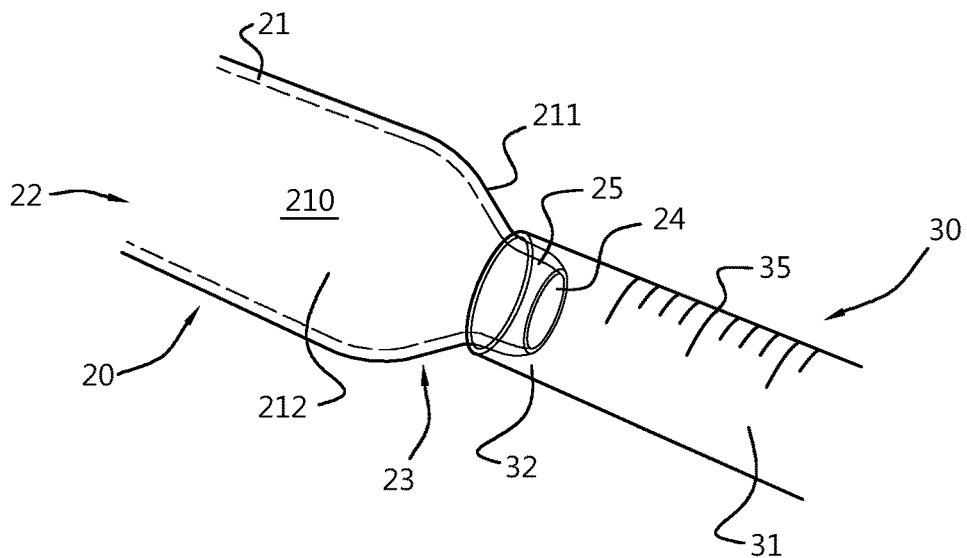
FIG. 2 shows in an enlarged view a specimen tube connected to a spout of a stick receptacle.

As shown in FIG. 2, the urine tube 30 is connectable to a distal end 23 of the stick receptacle 20. After filling the urine tube, the urine tube is removed from the stick receptacle. The stick receptacle 20 and the test 10 are disposed. The urine tube 30 is closed and ready to be transferred to a test apparatus for analysing the fluid specimen.

As indicated above, the specimen collection device 1 according to the invention is not limited to urinalysis methods. All kind of fluid specimens may be collected by the specimen collection device 1, like blood, beverage samples, water samples etc. for corresponding sample analyses, like blood tests, beverage or water quality tests.

Figure 4:
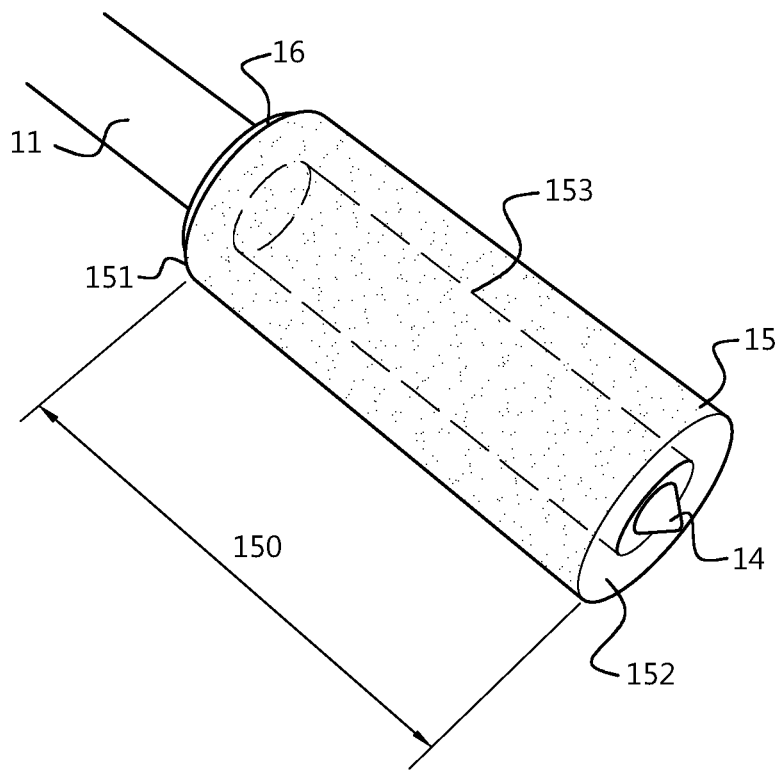
FIG. 4 shows an absorbent pad of a test stick and protruding stick tip in an enlarged view.

As further shown in FIG. 4, the stick body 11 has a distal stick end 111 with a stick tip 13. An absorbent pad 15 is positioned at the distal stick end 111. The absorbent pad 15 contains a liquid absorbing material. Here, the absorbent pad 15 is made of a urine sponge which is configured to absorb a volume of urine when the absorbent pad 15 is held in a stream of urine. Here, the absorbent pad 15 has a cylindrical shape with an absorbent pad length 150. The absorbent pad has a first pad end face 151 and a second pad end face 152. A pad channel 153 extends from the first pad end face 151 to the second pad end face 152. The absorbent pad 15 circumvents the distal stick end 111. The absorbent pad 15 is configured to absorb a volume of liquid of at least 0.5 mL, in particular 2 mL, more in particular at least 4 mL. Advantageously, the absorbent pad 15 has a sufficient absorbent capacity to fill a specimen tube in one step in which the test stick 10 is only held once in contact with a liquid to absorb a required quantity of liquid.

After absorbing a fluid specimen, the test stick 10 is to be received in the stick receptacle 20. Here, the stick receptacle 20 has an elongated tubular shape. The stick receptacle 20 has a tubular body 21. The stick receptacle 20 is a hollow sleeve. The stick receptacle 20 has an interior squeeze chamber 210. The squeeze chamber 210 is configured to compress the absorbent pad 15. During compression, the absorbent pad 15 slides along the stick body 11. When compressing the absorbent pad 15 in the squeeze chamber 210, the fluid specimen is extracted under pressure.

As shown in FIGS. 1 and 2, the stick receptacle 20 is open at a proximal end for inserting the stick tip 13 into the squeeze chamber 210. The squeeze chamber 210 has a chamber end face 211 at a distal end of the stick receptacle 20 for compressing the absorbent pad 15. The fluid specimen is released from the absorbent pad 15 when the absorbent pad 15 is pressed against chamber end face 211.

Here, the chamber end face 211 is tapered. The tubular body 21 has a tapered bottom region. The interior squeeze chamber 210 is provided with at least one squeeze rib 212. Preferably, a plurality of squeeze ribs 212 is provided in the squeeze chamber 210. Each squeeze rib 212 extends in a length direction of the stick receptacle 20. The squeeze rib contributes to an optimal squeezing of the absorbent pad 15 when received in the squeeze chamber 210. To further optimise the squeezing of the absorbent pad 15, the stick body 11 is provided with a pressure member 16. The pressure member 16 is disc-shaped. Here, the pressure disc is integral with the stick body 11. The stick body 11 is made by injection moulding in which the grip 12, the pressure member 16 and the tip head 14 are integral parts.

Figure 3:
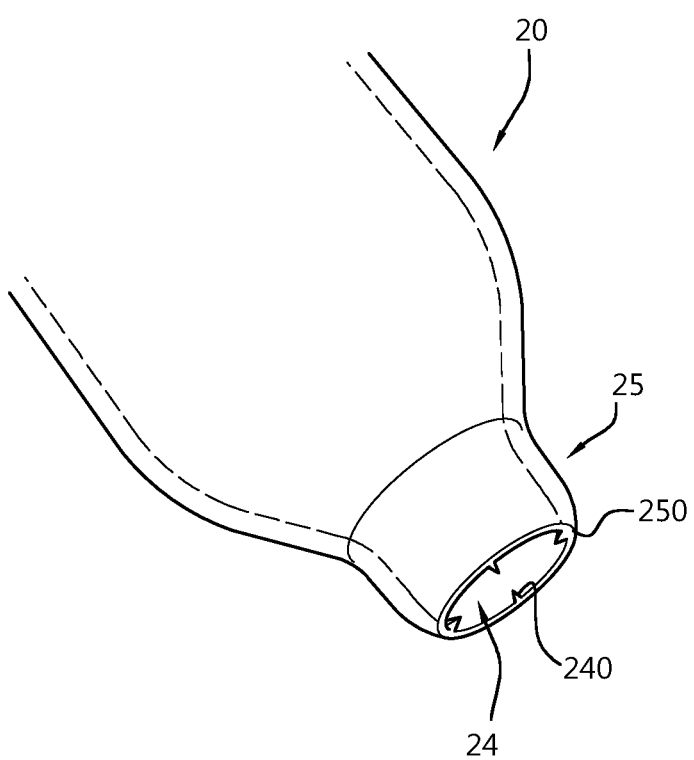
FIG. 3 shows the spout of the stick receptacle in an enlarged view.

An outlet port 24 is positioned in the chamber end face 211. The outlet port 24 is shown in an enlarged view in FIG. 3. The outlet port 24 is positioned at the distal end of the stick receptacle for discharging the fluid specimen. Here, the outlet port 24 has a non-circular shape, in particular a star-shape. The outlet port 24 comprises at least one dent 240 positioned at the circumference. The non-circular shape is beneficial in that it prevents an obstruction of a liquid flow when the tip head 14 passes through the outlet port 24. Further, the at least one dent 240 contributes to an alignment of the stick tip 13 during operation.

The squeeze chamber 210 and a connected specimen tube 30 is shown in FIG. 2. The specimen tube 30 is detachably connected to a spout 25 of the stick receptacle 20. The specimen tube 30 is connectable to the stick receptacle 20 by placing the specimen tube head 32 over the spout 25. The spout 25 is insertable into the specimen tube head 32. The spout 25 has a spout outer surface 250 which is configured in correspondence with an inner surface diameter 320 of a specimen tube head 32. A placement of the specimen tube 30 overlying the spout 25 is beneficial for using common tubes for test apparatuses, because this placement does not affect a closure of the specimen tube by a tube cap or seal at an outer side of the specimen tube.

As shown in an enlarged view in FIG. 4, the stick tip 13 protrudes the absorbent pad 15. The stick tip 13 extends beyond the absorbent pad 15. The absorbent pad 15 is positioned behind the stick tip 13. The positioning of the stick tip 13 close to an end face of the absorbent pad, preferably outside the absorbent pad 15 is functional which will be explained in further detail hereafter. In short wordings, in operation, after absorbing a fluid specimen and inserting the test stick 10 into an inner space of the stick receptacle 20, the stick tip 13 at a front, will first reach a bottom region of the inner space in the stick receptacle before substantially squeezing the absorbent pad 15 in the inner space. This is beneficial to obtain a proper operation of the specimen collection device 1.

The stick tip 13 has a converting tip head 14 which is here pointed. The tip head 14 may be tapered or conical and may have a shape of a mushroom. The mushroom-shaped tip head 14 has an outer diameter which is larger than a diameter of the stick body 11.

FIG. 5-9 show in successive drawings several steps of a method of collecting a fluid specimen and filling a specimen tube.

Figure 5:
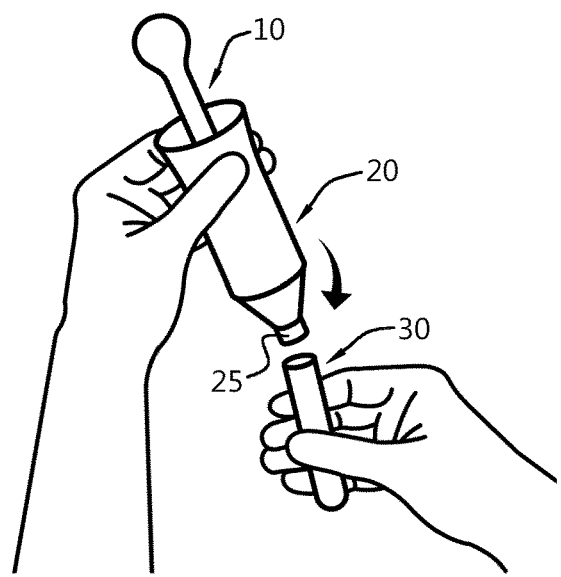
FIG. 5-9 show successive steps of a method of collecting a fluid specimen.

FIG. 5 shows the specimen collection device formed by an assembly of a test stick 10 positioned inside a stick receptacle 20 which is connected to a specimen tube 30. After connecting the specimen tube 30 to the spout 25 of the stick receptacle 20, the assembly is ready for use.

Figure 6:
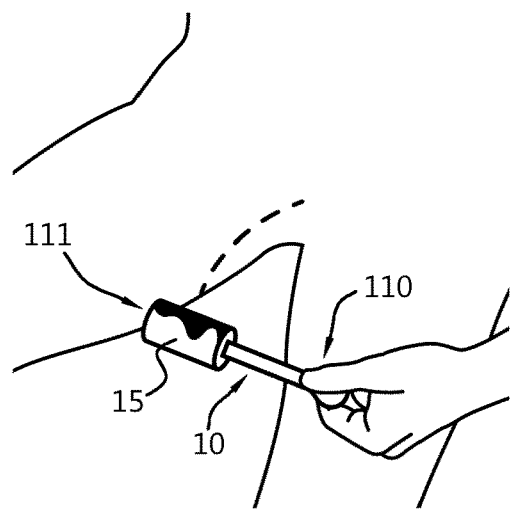

FIG. 6 shows a collection of a fluid specimen. The test stick 10 is held by the user at a proximal stick end 110. The absorbent pad 15 is positioned at the distal stick end 111 and exposed to a fluid to obtain the fluid specimen. Here, the fluid is a stream of urine. The absorbent pad 15 is configured to absorb a volume of the stream of urine.

Figure 7:
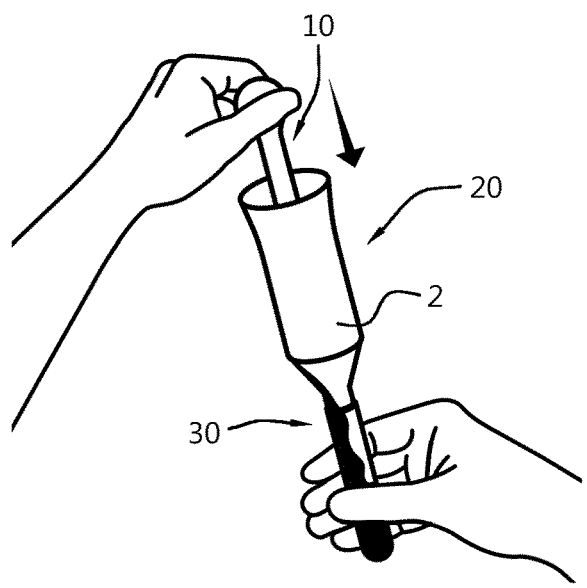

FIG. 7 shows a successive step in which the test stick 10 is inserted into the stick receptacle 20. The test stick 10 is pressed to a bottom region of the stick receptacle and fluid is squeezed out of the absorbent pad. The released fluid is discharged under gravity from the stick receptacle 20 to the specimen tube 30.

Figure 8:
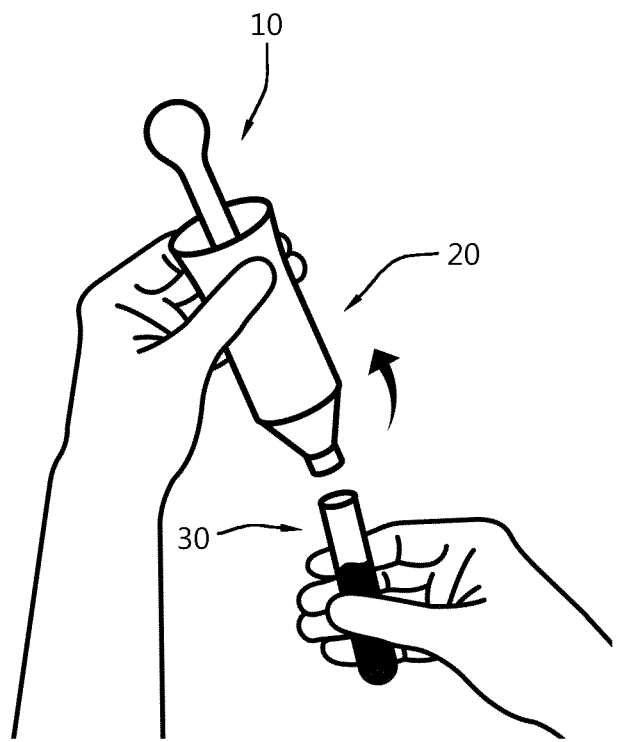
Figure 9:
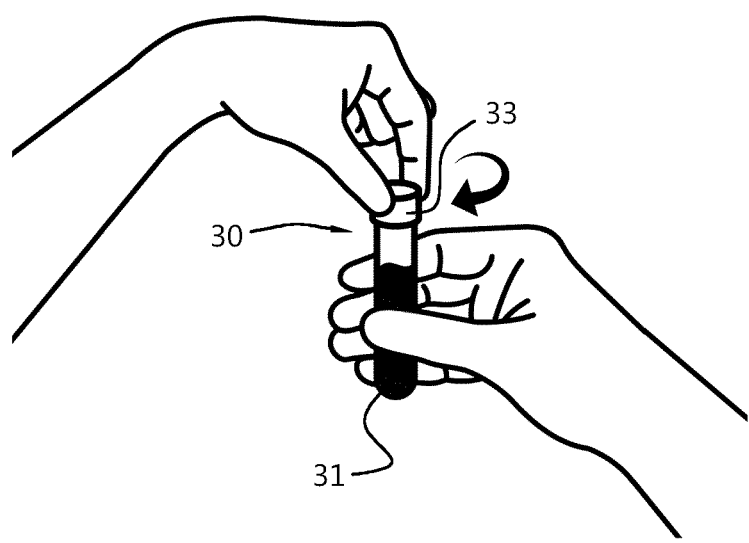
Figure 10:
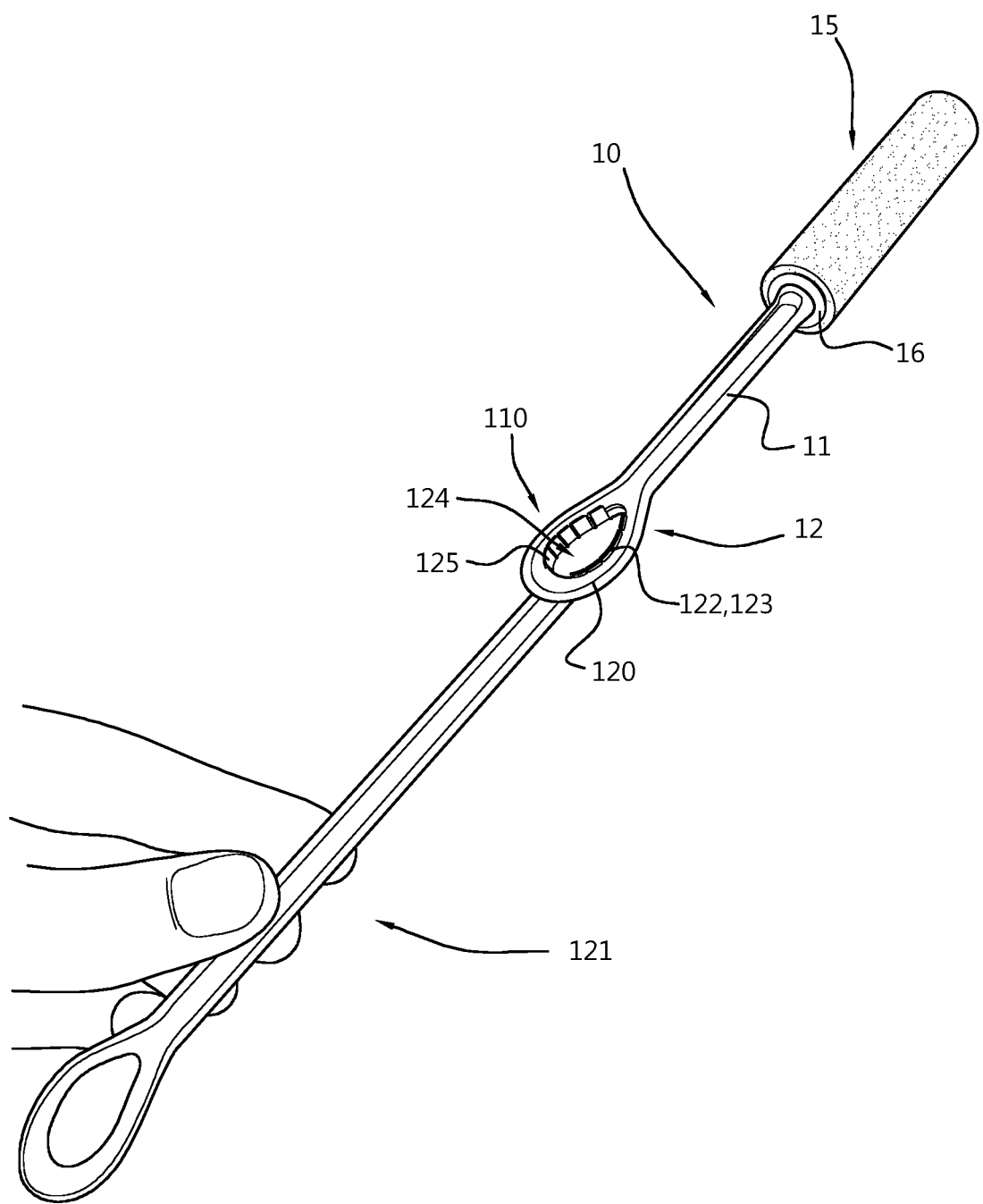
FIG. 10 shows a stick extension for lengthening a test stick.

FIG. 8 shows a removal of the specimen tube 30 from the assembly of the test stick 10 and the stick receptacle 20. The assembly can be disposed in a garbage bin and the specimen tube 30 can be closed by a screw cap or snap-cap as shown in FIG. 9 to preserve the specimen tube for further steps of and analyses method;

FIG. 10 shows a stick extension 121 for lengthening a stick body 11 of a test stick 10. The stick extension 121 may be connectable in several manners. Here, as shown, the grip 12 of the stick body 11 has a grip snap member 122 which is here formed by an aperture 123 in a central region. The grip snap member 122 is configured to snap a distal end of the stick extension 121 to the grip 12 of the stick body 11. The aperture 123 has a non-circular shape, such that a rotational freedom of movement is blocked. The stick extension 121 has a complementary shaped snap member 124 at a distal end. The snap member 124 will change in the has at least one snap finger 125 to snap the stick extension 121 to the grip 12 of the stick body 11. The stick extension 121 has a grip which is equally shaped to the grip 12 of the test stick 10. The stick extension 121 is in particular beneficial in use of the specimen collection device as a veterinary specimen collection device for collecting a urine sample of an animal.

Although the present invention has been described in detail, it will be apparent to those skilled in the art that various changes and modifications can be made without departing from the scope of the invention as hereinafter claimed. It is intended that all such changes and modifications be encompassed within the scope of the present disclosure and claims.

Thus, the invention provides a specimen collection device comprising a test stick with an absorbent pad and a stick receptacle with a squeeze chamber and an outlet port at a distal end of the stick receptacle. The test stick has a stick body which extends through a pad channel, such that a stick tip of the stick body extends through the outlet port when squeezing the absorbent pad against a chamfer end face of the squeeze chamber. The absorbent pad 15 does not pass through the outlet port 24 but remains in the squeeze chamber 210. Only the stick tip passes through the outlet port. Advantageously, the test stick remains aligned inside the stick receptacle during squeezing which contributes to a proper release of fluid from the absorbent pad to obtain the fluid specimen in a specimen tube.

| Reference list | |
|---|---|
| 1 specimen collection device | 14 tip head |
| 10 test stick | 15 absorbent pad |
| 11 stick body | 150 absorbent pad length |
| 110 proximal stick end | 151 first pad end face |
| 111 distal stick end | 152 second pad end face |

-continued

Reference list

| | |
|---|---|
| 12 grip | 153 pad channel |
| 120 ridge | 16 pressure disc |
| 121 stick extension | 20 stick receptacle |
| 122 grip snap member | 21 tubular body |
| 123 aperture | 210 squeeze chamber |
| 124 stick extension grip | 211 chamber end face |
| 124 snap member | 212 squeeze rib |
| 125 snap finger | 22 proximal end |
| 13 stick tip | 23 distal end |
| 25 spout | 24 outlet port |
| 250 spout outer surface | 240 outlet port dent |
| 30 specimen tube | 320 tube head inner surface |
| 31 tube body | 33 tube cap; tube closure |
| 32 tube head | 34 tube bottom |
| | 35 scale |
| | 36 tube label |

The invention claimed is:

1. A specimen collection device for collecting a fluid specimen in a specimen tube, the specimen collection device comprising:
a test stick for absorbing the fluid specimen, the test stick comprising an elongated stick body having a proximal stick end to be held by a user and a distal stick end with a stick tip, the stick body being provided with an absorbent pad at the distal stick end, and the absorbent pad containing a liquid absorbing material for absorbing the fluid specimen;
a stick receptacle for receiving the test stick, the stick receptacle having an interior squeeze chamber for squeezing the absorbent pad to extract fluid out of the absorbent pad, the stick receptacle being open at a proximal end for inserting the stick tip into the squeeze chamber, the squeeze chamber having a chamber end face at a distal end of the stick receptacle for compressing the absorbent pad to release fluid from the absorbent pad when a distal end of the absorbent pad is squeezed against the chamber end face, and the stick receptacle having a spout with an outlet port at the distal end for discharging fluid away from the squeeze chamber;
a specimen tube, the specimen tube being connectable to the spout of the stick receptacle for receiving the fluid specimen,
wherein the absorbent pad comprises a pad channel extending from a first pad end face to or near a second pad end face, wherein the stick body extends inside the absorbent pad through the pad channel, wherein the stick tip has an outer diameter smaller than an inner diameter of the outlet port to allow the stick tip to fully pass through the outlet port,
wherein the stick tip is arranged freely movable relative to the distal end of the absorbent pad,
wherein the proximal stick end is rigidly connected to the distal stick end,
wherein when inserting the test stick into the stick receptacle, the stick tip is received in the outlet port for aligning the test stick during squeezing whilst the absorbent pad abuts the chamber end face and the stick tip moves away from the absorbent pad, and
wherein the stick tip is arranged to pass through the outlet port, such that the outlet port aligns and supports the stick body.

2. The specimen collection device according to claim 1, wherein the absorbent pad comprises a fully through pad channel extending from the first to the second pad end face.

3. The specimen collection device according to claim 1, wherein the stick tip has a tip head positioned beyond the absorbent pad.

4. The specimen collection device according to claim 1, wherein the stick body has a pressure member positioned in abutting engagement with the first pad end face of the absorbent pad.

5. The specimen collection device according to claim 3, wherein the absorbent pad is enclosed between the pressure member and the tip head by a form closure.

6. The specimen collection device according to claim 1, wherein the stick tip has a tapered tip head, the tapered tip head being mushroom-shaped.

7. The specimen collection device according to claim 1, wherein the absorbent pad has an absorbent capacity of at least 0.5 mL and at most 12 mL.

8. The specimen collection device according to claim 1, wherein the absorbent pad comprises a foam material, in the form of a urine sponge.

9. The specimen collection device according to claim 1, wherein the proximal stick end is provided with a grip, and wherein the grip is a plate-shaped finger grip including an outer circumferential upstanding ridge.

10. The specimen collection device according to claim 9, further comprising a stick extension, the grip having an aperture forming a grip snap member for attaching the stick extension, wherein in particular the aperture is a non-circular aperture positioned in a central region of the grip.

11. The specimen collection device according to claim 10, further comprising a stick extension provided with a complementary shaped snap member for connecting the stick extension to the grip snap member of the test stick, wherein the snap member comprises at least one snap finger for snapping the stick extension to the grip snap member.

12. The specimen collection device according to claim 1, wherein the outlet port is non-circular, comprising at least one outlet port dent.

13. The specimen collection device according to claim 1, wherein the outlet port is star-shaped.

14. The specimen collection device according to claim 1, wherein the chamber end face is tapered in a length direction of the squeeze chamber.

15. The specimen collection device according to claim 1, wherein the chamber end face of the squeeze chamber comprises at least one rib for squeezing the absorbent pad.

16. The specimen collection device according to claim 1, wherein the stick receptacle has a spout for connecting the specimen tube to the stick receptacle by inserting the spout into the specimen tube, and wherein the spout has an elongated spout body having a spout length in which along the length, the spout body has a first outer diameter which is larger than a second outer diameter for fitting different sizes of specimen tubes.

17. The specimen collection device according to claim 1, wherein the stick receptacle further comprises a spout adapter which fits onto the spout for adapting an outer diameter of the spout to an opening of a specimen tube head.

18. A specimen collection device for collecting a fluid specimen in a specimen tube, the specimen collection device comprising:
a test stick for absorbing the fluid specimen, the test stick comprising an elongated stick body having a proximal stick end to be held by a user and a distal stick end with a stick tip, the stick body being provided with an absorbent pad at the distal stick end, and the absorbent pad containing a liquid absorbing material for absorbing the fluid specimen, wherein the elongated stick body is a one-piece item, a stick receptacle for receiving the test stick, the stick receptacle having an interior squeeze chamber for squeezing the absorbent pad to extract fluid out of the absorbent pad, the stick receptacle being open at a proximal end for inserting the stick tip into the squeeze chamber, the squeeze chamber having a chamber end face at a distal end of the stick receptacle for compressing the absorbent pad to release fluid from the absorbent pad when the absorbent pad is squeezed against the chamber end face, and the stick receptacle having a spout with an outlet port at the distal end for discharging fluid away from the squeeze chamber;

a specimen tube, the specimen tube being connectable to the spout of the stick receptacle for receiving the fluid specimen and to allow a passage of the stick tip through the outlet during squeezing in which the stick tip moves away from the absorbent pad, wherein the absorbent pad comprises a pad channel extending from a first pad end face to or near a second pad end face, wherein the stick body extends inside the absorbent pad through the pad channel and is not fixed to a distal end of the absorbent pad so that the distal end of the absorbent pad slides along the stick body toward the proximal stick end.

19. A specimen collection device for collecting a fluid specimen in a specimen tube, the specimen collection device comprising:

a test stick for absorbing the fluid specimen, the test stick comprising an elongated stick body having a proximal stick end to be held by a user and a distal stick end with a stick tip, the stick body being provided with an absorbent pad at the distal stick end, and the absorbent pad containing a liquid absorbing material for absorbing the fluid specimen;

a stick receptacle for receiving the test stick, the stick receptacle having an interior squeeze chamber for squeezing the absorbent pad to extract fluid out of the absorbent pad, the stick receptacle being open at a proximal end for inserting the stick tip into the squeeze chamber, the squeeze chamber having a chamber end face at a distal end of the stick receptacle contacting a distal end of the absorbent pad for compressing the absorbent pad to release fluid from the absorbent pad when the absorbent pad is squeezed against the chamber end face, and the stick receptacle having a spout with an outlet port at the distal end for discharging fluid away from the squeeze chamber;

a specimen tube, the specimen tube being connectable to the spout of the stick receptacle for receiving the fluid specimen, wherein the absorbent pad comprises a pad channel extending from a first pad end face to or near a second pad end face, wherein the stick body extends inside the absorbent pad through the pad channel, and wherein the stick tip is movable with respect to the distal end of the absorbent pad, so that the stick tip is allowed to fully pass through the outlet port and move away from the distal end of the absorbent pad when the absorbent pad is squeezed against the chamber end face.

* * * * *